United States Patent [19]

Simandl et al.

[11] Patent Number: 5,500,450
[45] Date of Patent: Mar. 19, 1996

[54] ULTRA-LOW DENSITY MICROCELLULAR POLYMER FOAM AND METHOD

[75] Inventors: Ronald F. Simandl, Farragut; John D. Brown, Harriman, both of Tenn.

[73] Assignee: The United States of America as represented by the Department of Energy, Washington, D.C.

[21] Appl. No.: 417,366

[22] Filed: Apr. 5, 1995

[51] Int. Cl.⁶ .................................................. C08J 9/28
[52] U.S. Cl. ........................... 521/64; 521/141; 521/142; 521/143
[58] Field of Search ................................ 521/64, 141, 142, 521/143

[56] References Cited

U.S. PATENT DOCUMENTS

| | | |
|---|---|---|
| 4,247,498 | 1/1981 | Castro . |
| 4,430,451 | 1/1984 | Young et al. . |
| 4,673,695 | 6/1987 | Aubert et al. . |
| 4,832,881 | 5/1989 | Arnold et al. . |
| 5,208,003 | 5/1993 | Simandl et al. . |
| 5,268,395 | 12/1993 | Simandl et al. . |
| 5,300,272 | 4/1994 | Simandl et al. . |

OTHER PUBLICATIONS

Spielman, R. B. et al "Z–pinch Implosions onto extremely low–density foam cylinders" Appl Phys Lett. 47(3) 1 Aug. 1985, pp. 229–231.

"Low–Density Polymer Foams for Fusion–Fuel Capsules" E&TR Oct. 1989, pp. 12–20.

LeMay, J. D. et al "Low–Density Microcellular Materials" VCRL–JC–104935, Dec. 1990 (Preprint).

*Primary Examiner*—Morton Foelak
*Attorney, Agent, or Firm*—Emily G. Schneider; Stephen D. Hamel; William R. Moser

[57] ABSTRACT

An ultra-low density, microcellular open-celled polymer foam and a method for making such foam. A polymer is dissolved in a heated solution consisting essentially of at least one solvent for the dissolution of the polymer in the heated solution and the phase inversion of the dissolved polymer to a liquid gel upon sufficient cooling of the heated solution. The heated solution is contained in a containment means provided with a nucleating promoting means having a relatively rough surface formed of fixed nucleating sites. The heated solution is cooled for a period of time sufficient to form a liquid gel of the polymer by phase inversion. From the gel, a porous foam having a density of less than about 12.0 mg/cm³ and open porosity provided by well interconnected strut morphology is formed.

17 Claims, No Drawings

ULTRA-LOW DENSITY MICROCELLULAR POLYMER FOAM AND METHOD

BACKGROUND OF THE INVENTION

This invention relates generally to microcellular polymer foams and more particularly to an ultra-low density, microcellular open-celled polymer foam having a density of less than about 12.0 mg/cm$^3$ and open porosity provided by well interconnected strut morphology and a method for making such foam. The United States Government has rights to this invention pursuant to Contract No. DE-ACO5-840R21400 with Martin Marietta Energy Systems, Inc., awarded by the U.S. Department of Energy.

Low density microcellular polymer and carbon foams, useful as catalyst supports, absorbents, filters, electrodes, and the like, have been the subject of intense research for the past ten years. Low density microcellular polymer foams have been made by several techniques including sol-gel replication and phase inversion processes. These methods are described in the publication "Low-Density Microcellular Materials", LLNL Document No. UCRL-JC-104935, December 1990 (Preprint). The phase inversion process as described in this publication and in U.S. Pat. No. 4,832,881, issued May 23, 1989, involves dissolving a carbonizable polymer in a suitable solvent at an elevated temperature and cooling the resulting solution at a controlled rate to allow the selected polymer to undergo phase inversion and form an interconnected gel. The solvent is removed from the gel by vacuum sublimation or extraction with supercritical carbon dioxide. The resulting open-celled porous foam is then air cured at an elevated temperature and carbonized to form a microcellular carbon foam product.

The U.S. Department of Energy has funded research on low density microcellular polymer foams for the development of direct-drive targets for inertial confinement fusion (ICF) research. In order to define and stabilize the configuration of the direct-drive target, the requirements for ICF low density microcellular open-celled foam include low atomic number with elements having higher atomic numbers than silicon contributing less than 1 at. % of the foam, and elements between nitrogen and silicon contributing less than 10 at. % of the foam. In addition, these foams must be composed of interconnected pores with no closed porosity. Ideally, the density of the foam should be in the range of from about 3.0 to 6.0 mg/cm$^3$ and cell diameter should be less than 1 μm. Production of uniform, microcellular polymer foams using the above described processes is now commonplace for densities above 6 mg/cm$^3$, however, production of such uniform foams below 6 mg/cm$^3$ has proven difficult. Although researchers at Lawrence Livermore National Laboratory have described in the above publication a microcellular foam with a density of 3 mg/cm$^3$, this foam consists primarily of the higher atomic weight —Si—O structure and is therefore less desirable for ICF target purposes. In addition, U.S. Pat. No. 4,430,451, (Young et al) issued Feb. 7, 1984, discloses a low density microcellular polymer foam of poly(4-methyl-1-pentene) with a density of about 10 to 100 mg/cm$^3$. However, it has been found that a foam having a density of 10 mg/cm$^3$ produced by the method disclosed in Young does not have a uniform distribution of cell sizes. In addition, the Young process depends on a controlled cooling rate from 180° C. to 160° C. to achieve the desired cell structure. In the present invention, cooling rate is not critical. Furthermore, the Young process utilizes a bibenzyl solvent, which is a hazardous solvent and would not be suitable for use in large volume production of foam.

Accordingly, a need in the art exists for an ultra-low density, microcellular open-celled polymer foam having a density of less than about 12.0 mg/cm$^3$ and open porosity provided by well interconnected strut morphology, which can be used as ICF targets and utilizes suitable solvents, and a method for making such foam.

SUMMARY OF THE INVENTION

In view of the above need, it is an object of this invention to provide an ultra-low density, microcellular open-celled polymer foam having a density of less than about 12.0 mg/cm$^3$ and open porosity provided by well interconnected strut morphology.

Another object of this invention is to provide a method for making an ultra-low density, microcellular open-celled polymer foam having a density of less than about 12.0 mg/cm$^3$ and open porosity provided by well interconnected strut morphology.

Further, it is an object of this invention to provide an ultra-low density, microcellular open-celled polymer foam having a density of less than about 12.0 mg/cm$^3$ and open porosity provided by well interconnected strut morphology which can be used as ICF targets, and a method for making such foam.

It is another object of this invention to provide a method as in the above objects that uses suitable solvents.

Briefly, the present invention is an ultra-low density, microcellular open-celled polymer foam and a method for making such foam comprising the steps of: dissolving a polymer in a heated solution consisting essentially of at least one solvent for the dissolution of the polymer in the heated solution and the phase inversion of the dissolved polymer to a liquid gel upon sufficient cooling of the heated solution wherein the polymer forms the quasi-continuous phase and the solvent forms the dispersed phase; containing the heated solution including the dissolved polymer in a containment means provided with a nucleating promoting means having a relatively rough surface formed of fixed nucleating sites; cooling the heated solution in the containment means for a period of time sufficient to form a liquid gel of the polymer by phase inversion; and forming a porous foam from the liquid gel, the foam having a density of less than about 12.0 mg/cm$^3$ and open porosity provided by well interconnected strut morphology.

Additional objects, advantages, and novel features of the invention will be set forth in part in the description which follows, and in part will become apparent to those skilled in the art upon examination of the following or may be learned by the practice of the invention. The objects and advantages may be realized and attained by means of the instrumentalities and combinations particularly pointed out in the appended claims.

DETAILED DESCRIPTION

Successful production of ultra-low density microcellular polymer foams via the phase inversion process depends upon several factors including the choice of solvent or solvent blend, the nature of the polymer, the presence of various impurities, the pressure under which gelation occurs, and the temperature of the quench plate for solvents that are solid at room temperature. Previous attempts to produce ultra-low density microcellular polymer foams have been guided by the premise that small cells and overall homogeneity are obtained by quenching in the initial fine structure. In the present invention, fine structure and homogeneity are initiated by using a vessel or container provided with a nucleating promoting means having a relatively rough surface formed of fixed nucleating sites. When smooth walled containers are used in the phase inversion process for foams having a density of less than 10 mg/cm$^3$, poorly interconnected "soft" gels are formed that result in polymer foams characterized by random, large voids interspersed among regions of homogenous microcellular morphology. However, when rough nucleating surfaces are used, the resulting gels are well interconnected and have sufficient firmness to allow handling without damage. This was found to be the case even when polymer content was dropped to 0.25 phs (parts per hundred solvent). It was further discovered that once the gel had been allowed to develop maximum physical strength, the fine structure and homogeneity of the foam were preserved by quenching the dispersed phase solvent in the liquid gel on a cold plate at 0° C.±5° C. under approximately 50 psi pressure. The purpose of the pressure is to accommodate the shrinkage of the wax during solidification. The applied pressure forces the faces of the wax toward the center of the casting during solidification and thus prevents the wax from forming internal macrovoids.

The nucleating surfaces of the nucleating promoting means are sufficiently rough whenever the size of the nucleating sites on the surfaces approximate the desired cell size of the gel. Thus, for example, to produce gels with cell sizes in the range of from about 1 to 20 µm, the nucleating sites on the nucleating surfaces would range from about 0.1 µm to 400 µm. A suitable nucleating promoting means for use in the present invention includes a perforated thin-walled steel liner positionable inside the vessel. Such a liner is available commercially as "Micro-Etch®" (Buckbee-Mears Co., St. Paul, Minn.) and is a thin stainless steel liner which is preferably formed in the shape of a basket to facilitate handling of the resulting ultra-low polymer-content gels. The stainless steel liner was made from type 316 stainless steel with wall thickness of 203 µm and 356 µm. The 203 µm thick liner was provided with 178 µm diameter holes with the centers of the holes separated from one another by a 559 µm distance. The 356 µm thick liner is provided with 381 µm diameter holes separated from one another by a distance of 787 µm. While these holes may seem large compared to the resulting foam structure, micrographs of the holes reveal that they are tapered and have relatively rough surfaces. Other suitable nucleating promoting means include, but are not limited to, porous cotton bond paper or filter paper, lapping and polishing films, and silicon carbide or other type abrasive paper. Experiments with various loose particulates as nucleating promoting means revealed these to be totally ineffective at generating firm gels, and thus, the nucleating sites must be fixed and rigid on the nucleating surface.

EXAMPLES

The following examples are given to illustrate the process of the present invention and are not to be taken as limiting the scope of the invention which is defined in the appended claims. In the present invention, the heated solution, heated to a temperature of from about 100° C. to 160° C., comprises about 0.20 to 1.0 wt. % polymer and about 99.8 to 99.0 wt. % solvent. In addition, while the following examples give a method for producing an ultra-low density microcellular open-celled polymer foam using two types of polymers, the method can be extended to produce ultra-low density foams from other classes of polymers wherever microcellular foams can be produced by thermally induced phase inversion.

EXAMPLE 1

A microcellular open-celled polymer foam having a density of approximately 3.25 mg/cm$^3$ was prepared by blending a eutectic mixture of 408 g naphthalene with 393 g durene and 2.0 g of Mitsui® DX845 high molecular weight poly(4-methyl-1-pentene) (0.25 phs of 800 g solvent). The resulting solution was then heated, and once the poly(4-methyl-1-pentene) dissolved to form a clear solution (about 150° C.), the hot, clear melt was poured into a pre-heated (150° C.) 6 cm×10 cm×20 cm Pyrex® dish which was lined with 125 µm thick Fort Ancient® 50% cotton bond paper which acted as the nucleating promoting means. Under magnification, the cotton bond paper appeared as a mat of randomly oriented fibers measuring <20 µm in thickness and several hundreds/µm long, with an abundance of fixed nucleating sites. The solution was covered with a porous ceramic fiber insulator and allowed to cool and gel. The purpose of the ceramic insulator, in addition to providing thermal insulation, was to capture the vapor phase of the solvent and to keep it from condensing and dropping back into the liquid gel thereby disturbing the uniform formation of the gel. To facilitate formation of the porous foam and "lock in" the fine structure of the gel, the dish and gel were then carefully moved to a 0° C. chill plate mounted in a pressure vessel in order to quench the liquid gel. Solidification was allowed to occur overnight under 50 psi nitrogen pressure to form a wax. Following solidification, the solvent was removed from the wax using vacuum sublimation to produce a foam. Samples cut from the resulting wax and extracted under vacuum produced a foam having a density that ranged from about 3.1 to 3.4 mg/cm$^3$. Scanning electron microscopy of the foam revealed an open interconnected morphology with regions of <20 µm diameter cells surrounding larger approximately 100 µm diameter cells.

Typically in order to form gels of poly(4-methyl-1-pentene) in smooth-walled molds, a polymer content in excess of 0.75 phs was required.

EXAMPLE 2

A microcellular open-celled polymer foam having a density of approximately 4.30 mg/cm$^3$ was prepared by blending a eutectic mixture of 408 g naphthalene with 393 g durene and 2.0 g of Mitsui® DX845 high molecular weight poly(4-methyl-1-pentene) (0.25 phs of 800 g solvent). The resulting solution was then heated, and once the poly(4-methyl-1-pentene) dissolved to form a clear solution (about 150° C.), the hot, clear melt was poured into a pre-heated (150° C.) 6 cm×10 cm×20 cm Pyrex® dish which was lined with 600 grit silicon carbide abrasive paper. Under scanning electron microscope, the paper appeared to be "open-coated" with shards of silicon carbide that measured typically <50 µm long. The solution was covered with a porous ceramic fiber insulator and allowed to cool and gel. To quench the liquid gel and to form a wax, the dish and gel were then carefully moved to a 0° C. chill plate mounted in a pressure vessel and solidification occurred overnight under 50 psi nitrogen pressure. Following solidification, the solvent was removed from the wax using vacuum sublimation to produce a foam. Samples cut from the resulting wax and extracted under vacuum produced a foam having a density that ranged from about 4.1 to 4.5 mg/cm$^3$. The resulting foams appeared to be somewhat rugged and withstood handling. Scanning electron microscopy of the foam revealed zones of 10–20 μm cells surrounding larger cells approximately 100 μm in diameter.

EXAMPLE 3

A microcellular open-celled polymer foam having a density of approximately 3.80 mg/cm$^3$ was prepared by blending a mixture of 408 g naphthalene with 393 g durene and 1.5 g of Mitsui® DX845 high molecular weight poly(4-methyl-1-pentene) (0.19 phs of 800 g solvent). The resulting solution was then heated, and once the poly(4-methyl-1-pentene) dissolved to form a clear solution (about 150° C.), the hot, clear melt was poured into a pre-heated (150° C.) 6 cm×10 cm×20 cm Pyrex® dish which was lined with 0.3 μm lapping and polishing, aluminum oxide film. Under the scanning electron microscope, the surface of the lapping film appeared to be covered with interconnected patches of adhesive that measured in the tens of microns in diameter. These patches of adhesive held a range of aluminum oxide shards, which acted as nucleating sites, that measured typically from ≧10 μm. Once poured, the hot melt was covered with a porous ceramic fiber insulator and allowed to cool and gel. To quench the liquid gel and to form a wax, the dish and gel were then carefully moved to a 0° C. chill plate mounted in a pressure vessel and solidification occurred overnight under 50 psi nitrogen pressure. Following solidification, the solvent was removed from the wax using vacuum sublimation to produce a foam. Samples cut from the resulting wax and extracted under vacuum produced a foam having a density that ranged from about 3.4 to 4.0 mg/cm$^3$. The resulting foams appeared to be somewhat rugged and withstood handling. Scanning electron microscopy revealed zones of 10–20 μm cells surrounding larger cells approximately 100 μm in diameter.

EXAMPLE 4

A microcellular open-celled polymer foam having a density of approximately 12.0 mg/cm$^3$ was prepared by blending a mixture of 250 g cyclohexanol and 2.5 g acetate end-capped polyacetal (1.0 phs of 250 g solvent, polyacetal sold under the trademark Delrin®, a product of DuPont, Willmington, Del.). The resulting solution was then heated and once the polyacetal dissolved to form a clear solution (about 150° C.), the hot, clear melt was poured into a 6.5 cm×6.5 cm×4.5 cm basket made from Micro-Etch® stainless steel, lined with 125 μm inch thick Fort Ancient® 50% cotton bond paper which was described in Example 1 above. The lined basket was contained in a 9.5 cm diameter Pyrex® crystallization dish. The solution was then covered with a porous ceramic fiber insulator and allowed to cool and gel. The above mix formed a well interconnected, semi-firm gel. To form the porous foam, the dish and gel were then carefully covered with methanol and given six days for the methanol to exchange the cyclohexanol. During solvent exchange, the gel shrank only slightly away from the paper liner. The methanol and residual cyclohexanol were extracted with supercritical carbon dioxide. The porosity of the Micro-Etch® basket allowed the supercritical carbon dioxide to have easy access to all sides of the gel. Shrinkage of the foam was minimal. The resulting white foam had a density of approximately 12.0 mg/cm$^3$ and was firm enough to support its own weight and shape. Scanning electron microscopy of the foam revealed an open, reticulated foam morphology with typically 10 μm to 20 μm diameter cells.

Companion 1.0 phs gels that were cast in smooth-walled glass beakers were not well-formed and did not have adequate strength to allow for methanol exchange. It was not possible to carry these gels to the foam stage.

EXAMPLE 5

A microcellular open-celled polymer foam having a density of approximately 7.80 mg/cm$^3$ was prepared as described in the above example using a mixture of 250 g cyclohexanol and 1.25 g acetate end-capped polyacetal (0.5 phs of 250 g solvent). The resulting white foam was firm enough to support its own weight and shape, indicating that even lower foam densities are possible. Scanning electron microscopy revealed an open, reticulated foam morphology with typically 10 μm to 20 μm diameter cells.

TABLE I

SUMMARY OF RESULTS

| Example No. | Polymer | Nucleating Means | Density (mg/cm$^3$) |
| --- | --- | --- | --- |
| 1 | poly(4-methyl-1-pentene) | 50% cotton bond paper | 3.25 |
| 2 | poly(4-methyl-1-pentene) | silicon carbide abrasive paper | 4.30 |
| 3 | poly(4-methyl-1-pentene) | aluminum oxide polishing film | 3.80 |
| 4 | polyacetal | 50% cotton bond paper | 12.0 |
| 5 | polyacetal | 50% cotton bond paper | 7.80 |

In the present invention, the benefit obtained from using a nucleating promoting means having a relatively rough surface was discovered unexpectedly when attempting to fabricate Micro-Etch® stainless steel baskets for the purpose of handling and extracting fragile gels. It was observed that when casting in these porous baskets, normally fragile gels became relatively firm and rigid. The use of nucleating promoting means as described in the present invention could extend to other low density foams made by the phase inversion process.

Thus, it will be seen that an ultra-low density open-celled microcellular polymer foam having a density of less than about 12.0 mg/cm$^3$ and open porosity provided by well interconnected strut morphology and a method for making the foam has been provided. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims attached to and forming a part of this specification.

We claim:

1. A method for making an ultra-low density, microcellular open-celled polymer from a member selected from the group consisting of an acetate end capped polyacetal and a (4-methyl-1-pentene)polymer foam, comprising the steps of:

a) dissolving a polymer in a heated solution consisting essentially of at least one solvent for the dissolution of said polymer in said heated solution and the phase inversion of said dissolved polymer to a liquid gel upon sufficient cooling of said heated solution;

b) containing said heated solution including said dissolved polymer in a containment means provided with a nucleating promoting means having a relatively rough surface formed of fixed nucleating sites wherein said nucleating sites are in the range of from about 0.1 microns to 400 microns;

c) cooling said heated solution in said containment means for a period of time sufficient to form said liquid gel of said polymer by phase inversion; and d) forming a porous foam from said liquid gel, said porous foam having a density of less than about 12.0 mg/cm$^3$ and open porosity provided by well interconnected strut morphology.

2. The method as in claim 1, wherein said at least one solvent is selected from the group consisting of naphthalene, durene, cyclohexanol, and mixtures thereof.

3. The method as in claim 2, wherein said heated solution comprises about 0.20 to 1.0 wt. % polymer and about 99.8 to 99.0 wt. % solvent.

4. The method as in claim 3, wherein said heated solution is at a temperature in the range of from about 100° C. to 160° C.

5. The method as in claim 4, wherein said containment means comprises a vessel.

6. The method as in claim 5, wherein said polymer is poly(4-methyl-1-pentene).

7. The method as in claim 6, wherein said step of forming said porous foam from said liquid gel comprises quenching said liquid gel in said vessel under a pressure of about 50 psi and a temperature of about 0° C. for a period of time sufficient to form a solid wax from said liquid gel and removing said at least one solvent from said wax by vacuum sublimation to form a porous foam having a density in the range of from about 3.25 to 4.30 mg/cm$^3$.

8. The method as in claim 7, wherein said nucleating promoting means is a perforated metal liner within said vessel.

9. The method as in claim 7, wherein said nucleating promoting means is a matted paper liner within said vessel.

10. The method as in claim 7, wherein said nucleating promoting means is an abrasive paper liner within said vessel.

11. The method as in claim 7, wherein said nucleating promoting means is an aluminum oxide polishing film liner within said vessel.

12. The method as in claim 5, wherein said polymer is acetate end-capped polyacetal.

13. The method as in claim 12, wherein the step of forming said porous foam from said liquid gel comprises removing said at least one solvent from said gel by exchanging said at least one solvent with a supercritically extractable solvent therefore and extracting this last mentioned solvent with supercritical carbon dioxide to form a porous foam having a density in the range of from about 7.80 to 12.0 mg/cm$^3$.

14. The method as in claim 13, wherein said nucleating promoting means is a perforated metal liner within said vessel.

15. The method as in claim 13, wherein said nucleating promoting means is a matted paper liner within said vessel.

16. The method as in claim 13, wherein said nucleating promoting means is an abrasive paper liner within said vessel.

17. The method as in claim 13, wherein said nucleating promoting means is an aluminum oxide polishing film liner within said vessel.

* * * * *